US006966120B2

(12) United States Patent
Lysen

(10) Patent No.: US 6,966,120 B2
(45) Date of Patent: Nov. 22, 2005

(54) PROCESS AND MEASUREMENT DEVICE FOR DETERMINING THE ALIGNMENT OF A CYLINDRICAL BODY

(75) Inventor: Heinrich Lysen, Garching (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 10/755,479

(22) Filed: Jan. 13, 2004

(65) Prior Publication Data

US 2004/0139621 A1 Jul. 22, 2004

(30) Foreign Application Priority Data

Jan. 15, 2003 (DE) .......................................... 103 01 304

(51) Int. Cl.⁷ ............................................... G01B 3/00
(52) U.S. Cl. .............................. 33/412; 33/529; 33/347; 33/318
(58) Field of Search ..................... 33/412, 529, 1 PT, 33/347, DIG. 1, 318, 320–322, 328, 340, 341, 343, 366.11, 397

(56) References Cited

U.S. PATENT DOCUMENTS

| | | | |
|---|---|---|---|
| 3,604,121 A | | 9/1971 | Hull |
| 5,026,998 A | * | 6/1991 | Holzl .................... 250/559.37 |
| 6,195,615 B1 | * | 2/2001 | Lysen .......................... 702/94 |
| 6,434,849 B1 | * | 8/2002 | Hermann ..................... 33/529 |
| 6,580,519 B1 | * | 6/2003 | Wick .......................... 356/614 |
| 6,591,218 B1 | | 7/2003 | Lysen |
| 6,763,597 B2 | * | 7/2004 | Lysen .......................... 33/286 |
| 6,784,986 B2 | * | 8/2004 | Lysen et al. ............. 356/152.2 |

FOREIGN PATENT DOCUMENTS

| | | |
|---|---|---|
| DE | 689 06 184 T2 | 9/1989 |
| DE | 696 19 549 T2 | 7/1997 |
| DE | 199 49 834 A1 | 4/2001 |
| DE | 100 51 870 A1 | 7/2001 |
| EP | 0 928 951 A2 | 7/1999 |
| WO | WO 99/64818 | 12/1999 |

OTHER PUBLICATIONS

Patent Abstracts of Japan, vol. 1998, No. 11, Sep. 30, 1998 & JP 10 160432 A (Nippon Steel Corp), Jun. 19, 1998 English Abstract.

* cited by examiner

Primary Examiner—Christopher W. Fulton
Assistant Examiner—Tania Courson
(74) Attorney, Agent, or Firm—Nixon, Peabody LLP; David S. Safran

(57) ABSTRACT

A process for determining the alignment of a cylindrical body with respect to a reference direction by means of a measurement device which has a first and a second attachment area and a position measurement probe which is calibrated to the reference direction and is made for detecting a first angle of rotation of the probe around a first axis fixed in space and a second angle of rotation of the probe around a second axis fixed in space. A first measurement and a second measurement is carried out at different areas of the body, the probe being swung in contact with the peripheral surface of the body relative to the first attachment area to measure a characteristic of the first and the second angle of rotation. A comparison of the characteristic of measurements is used to determine the alignment of the body with respect to the reference direction.

23 Claims, 6 Drawing Sheets

PROCESS AND MEASUREMENT DEVICE FOR DETERMINING THE ALIGNMENT OF A CYLINDRICAL BODY

BACKGROUND OF THE INVENTION

1. Field of the Invention

This invention relates to a process and a device for determining the alignment of a cylindrical body with respect to a reference direction by means of a position measurement probe which is calibrated to the reference direction and is made for detecting a first angle of rotation around a first defined axis fixed in space and a second angle of rotation around a second defined axis fixed in space.

2. Description of Related Art

Such an alignment measurement device and a measurement process are shown, for example, from published German Patent Application DE 199 49 834 A1 and corresponding U.S. Pat. No. 6,591,218, which a first position measurement is taken by means of a position measurement probe located in the first measurement position on the peripheral surface of the cylindrical body, and further, that a second position measurement is taken in at least one second measurement position on the peripheral surface of the body, which positions differs from the first measurement position by its angle of rotation in the peripheral direction with respect to the axis of the body, the alignment of the body with respect to the reference direction is then computed from the determined measurement data.

The disadvantage here is that, to determine the alignment of the body, measurement of the angle of rotation with the corresponding accuracy is essential.

SUMMARY OF THE INVENTION

A primary object of this invention is to devise a process and a device for determining the alignment of a cylindrical body while reducing the complexity of the measurement engineering.

This object is achieved by a process and a measurement device disclosed herein. The advantages of the present invention are achieved because the position measurement probe in the first and in the second measurement is pivoted around a fixed attachment point and the alignment of the body is determined from the characteristic of the first and the second angle of rotation, which characteristic is obtained in the first and second measurement. For the present invention, it is not necessary to directly represent a third angle of rotation of the probe, which thereby reduces the complexity of the equipment.

The invention is explained in detail by way of example below using the accompanying drawings.

DETAILED DESCRIPTION OF THE INVENTION

Figure 1:
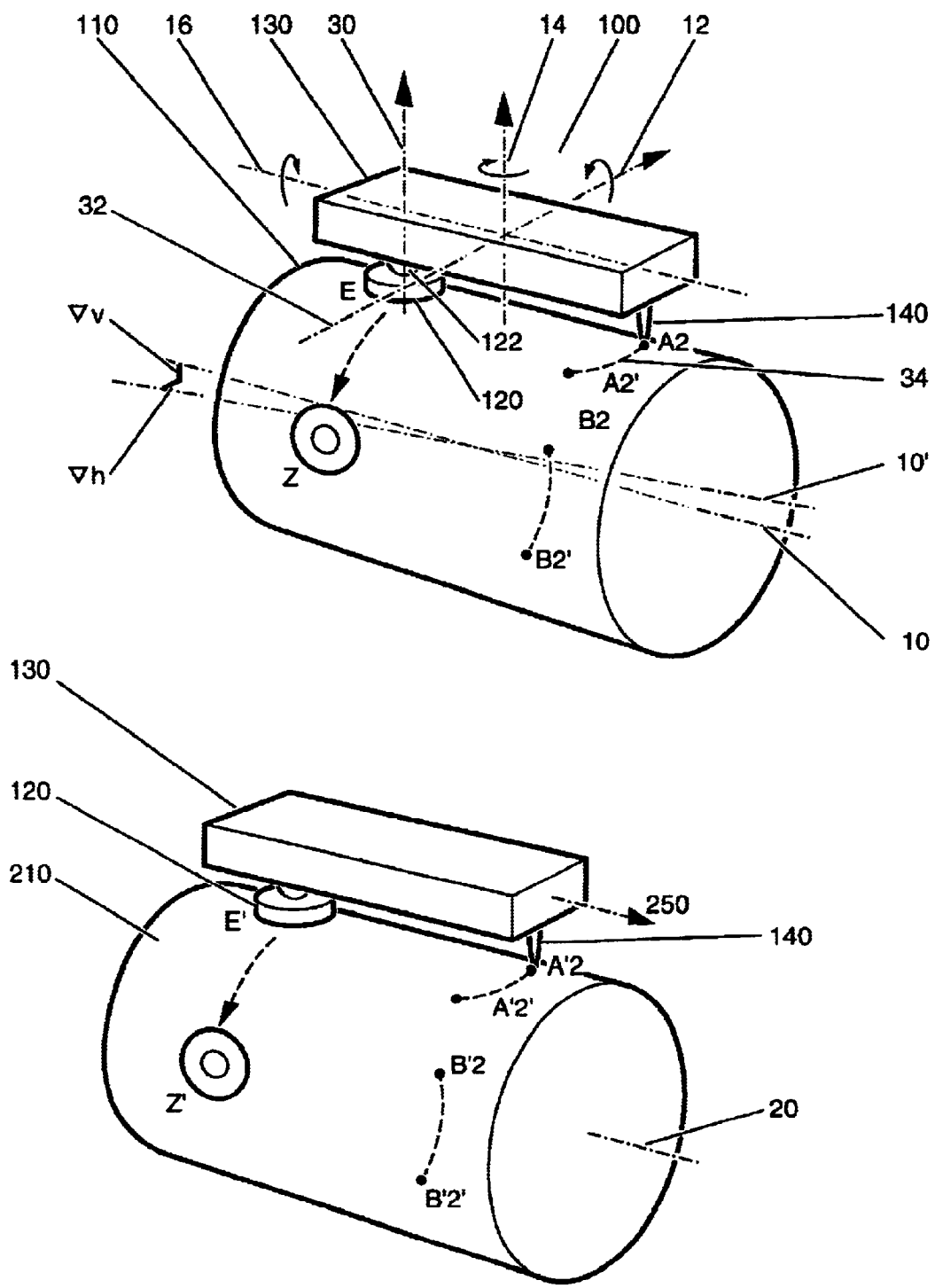
FIG. 1 shows a schematic representation of the determination of the alignment of two rollers by means of a measurement device according to a first embodiment of the invention.

FIG. 1 shows a measurement device 100 which is attached to or placed against the peripheral surface of a first roller 110 which can be, for example, a pressure roller.

The measurement device 100 comprises a position measurement probe 130 which on its front end has a first attachment area which is formed by the foot 120 of a magnet, and on its back end, has a second attachment area which is formed by a prod 140. The position measurement probe 130 is made such that, by means of a mechanical or optical gyro, the angle of rotation of the probe 130 around an elevation axis 12 fixed in space, which runs approximately in the transverse direction of the probe 130 and in the embodiment shown is essentially perpendicular to the lengthwise axis 10 of the roller and tangential to the peripheral surface of the roller, can be detected, as can an angle around an azimuth axis 14 which is perpendicular thereto and which, in this example, is essentially perpendicular to the lengthwise axis 10 of the roller and relative to the peripheral surface of the roller. Rotation around the axis 14 then changes the azimuth angle (yaw) and rotation around the axis 12 changes the elevation angle ("pitch").

The detection of the angle of rotation around the axis 16 which runs approximately in the lengthwise direction of the probe 130 and perpendicular to the axes 12 and 14 can also be performed, if necessary. Note, the rotation around the axis 16 specifies the so-called "roll angle".

FIG. 1 shows a measurement device 100 in the position at the start of the first measurement. Here, the foot 120 of the magnet in the first measurement position E is fixed with respect to the peripheral surface of the roller, while the prod 140 is attached at the point A2 on the peripheral surface of the roller. The probe 130 is supported with respect to the foot 120 of the magnet such that it can turn with respect to the foot of the magnet around an axis 30 which in the measurement position shown is essentially parallel to the axis 14, and around an axis 32 which is perpendicular thereto and which in the measurement position shown is essentially parallel to the axis 12.

The foot 120 of the magnet and the prod 140 are dimensioned such that the probe 130 is not tilted around the axis 12 with respect to the roller 110 or the lengthwise axis 10 of the roller, i.e., the probe 130 is to be as exactly parallel as possible to the roller surface. Furthermore, the lengthwise axis 16 of the probe 130 is preferably roughly parallel to the roller axis 10, i.e., the connecting line between the foot 120 of the magnet and the prod 140 is roughly parallel to the axis 10 of the roller.

The first measurement is taken by manually pushing the prod 140 from the support point A2 into contact with the peripheral surface of the roller to the support point A2' resulting in the probe 130 being pivoted around the axis 30 with respect to the foot 120 of the magnet. In FIG. 1, the line of motion of the prod 140 on the peripheral surface of the roller in the first measurement is labeled with reference number 34. Preferably, the points A2 and A2' are chosen such that when the prod 140 is located in the middle between the two points, the probe 130 is exactly parallel to the axis 10 of the roller.

During the entire swiveling movement from A2 to A2', the characteristic of the angle of rotation around the axes 12 and 14 (pitch and yaw angle) is recorded. The recording process can be started and stopped by a detector means which, for example, detects the pressure force of the prod 140 on the peripheral surface of the roller or the existence of electrical contact imparted by the peripheral surface of the roller between the foot 120 of the magnet and the prod 140.

Thereafter, the foot 120 of the magnet is released and the measurement device 100 is moved into a position in which the foot 120 of the magnet is fixed in the position Z on the peripheral surface of the roller, while the prod 140 is moved into the starting position B2. At this point, the second measurement can be started in which the prod 140 is moved, analogously to the first measurement, out of the position B2 into contact with the peripheral surface of the roller manually at position B2', at which time the second measurement is completed. By performing this second measurement analogously to the first measurement, the characteristic of the pitch and yaw angle during the motion of the prod 140 between the points B2 and B2' is continuously detected, similarly to the first measurement. Analogously to the first measurement, the probe 130 is pivoted around the bearing axis 30. The foot 120 of the magnet is made preferably such that the axis 30 can be swiveled around the axis 16 such that the axis 30 in the second measurement is at least roughly parallel to the orientation of the axis 30 in the first measurement, for example by the bearing being made as a ball bearing. The orientation of the swiveling axis 30 could be monitored, for example, by means of a pendulum weight or a bubble level which is provided on the probe 130 (not shown).

The object of the above measurements is to determine the alignment of the roller axis 10 with respect to the reference direction 10', i.e., the horizontal deviation Δh and the vertical deviation Δv of the roller axis 10 with respect to the reference direction 10'. For this purpose, the probe 130 is calibrated to the reference direction 10', i.e., the probe 130 measures the pitch and the yaw angle as the deviation from the reference direction.

Figure 5:
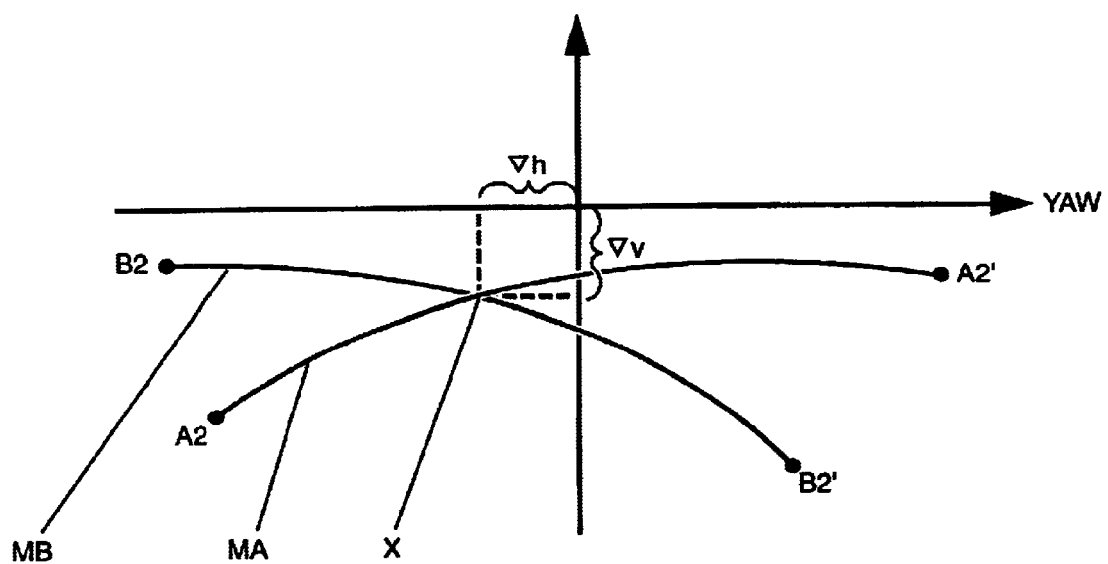
FIG. 5 is a graph of the measurement results of the process of the invention.

FIG. 5 shows, for example, the result of the above described measurement process. For both the first measurement and the second measurement, the measured pitch angle is plotted as a function of the measured yaw angle. The curves of the first and the second measurements are labeled MA and MB, respectively. For both measurements, however, there is an arc with a radius which is identical but with a middle point which is different according to the different roll angle of the positions E and Z. In this way, the intersection point X of the two curves is formed, and from the intersection point coordinates, the Δh and Δv the corresponding horizontal or vertical offset of the roller axis 10 with respect to the reference direction 10' can be directly read. Measurement of the roll angle (rotation of the probe around the axis 16) is not necessary here, particularly when the roller angle is kept constant during the first and second measurements.

In the evaluation of the measurement curves as shown in FIG. 5, it is advantageous to determine by curve matching a respective compensation function from the measurement values of the first and the second measurement, that is, the determination of Δh and Δv being made from the intersection point of these compensation functions.

FIG. 1, furthermore, shows that the probe 130 after determining the alignment of the first roller 110 can be placed analogously against the second roller 210 in order to determine its alignment with respect to the reference direction 10' or another reference direction (in the latter case the calibration of the probe 130 must be changed accordingly before the measurement). For the case in which the second roller 210 is to be aligned parallel to the first roller 110, it is preferred for the determined alignment of the first roller 110 to be used as the reference direction for the measurement of the alignment of the second roller 210.

In FIG. 1, the corresponding measurement positions on the second roller 210 are labeled with the same letters as for the first roller 110, the latter however being provided with an apostrophe.

In addition to the determination of the misalignment with respect to the reference direction, the described measurement process can also be used, for example, to determine the radius s of the roller from the radii of the arcs MA and MB. In another embodiment, if instead of the two measurements described above for one roller, a third analogous measurement can be taken for a third roll angle which will enable the conicity or camber of the roller to be determined. It is noted that when the roll angle in the measurements changes only slightly, the corresponding scale factor error of the probe 130 for this angle can be relatively great.

Furthermore, in the process of the invention, it is possible to change very quickly from one roller to the other which reduces the demands on the stability of the gyro. That is, several rollers can be measured in a step-back process.

Figure 2:
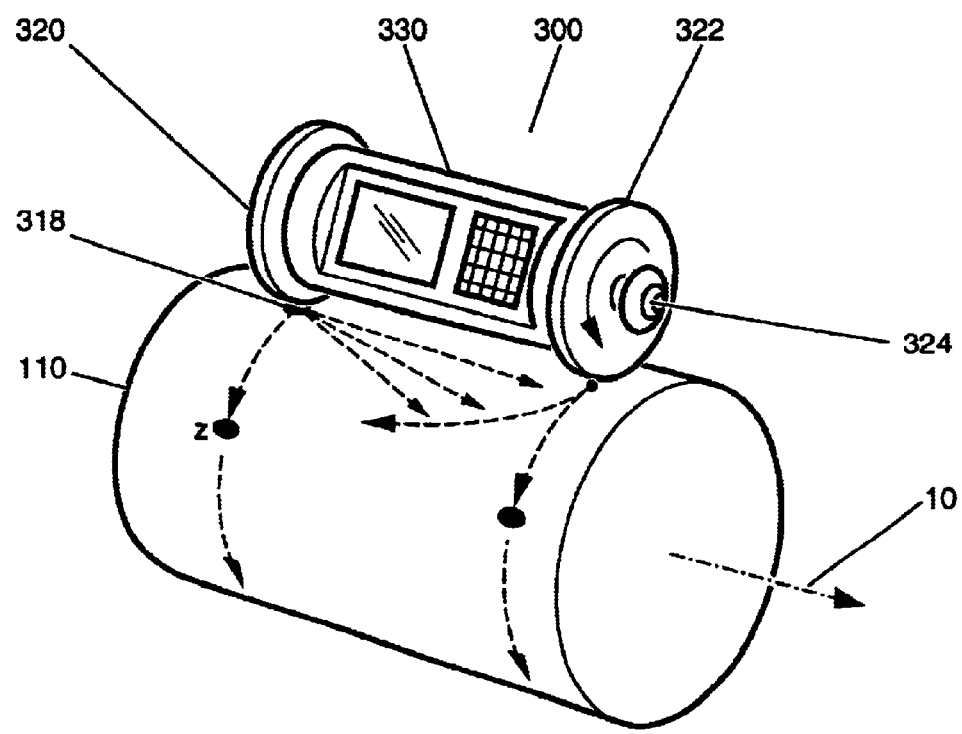
FIG. 2A is a schematic representation of the calibration of the probe relative to a reference direction before a first measurement by placement against a corresponding stationary reference surface combination.
FIG. 2B shows a schematic representation of the determination of the alignment of a roller by means of a measurement device according to a second embodiment of the invention.
Figure 2:
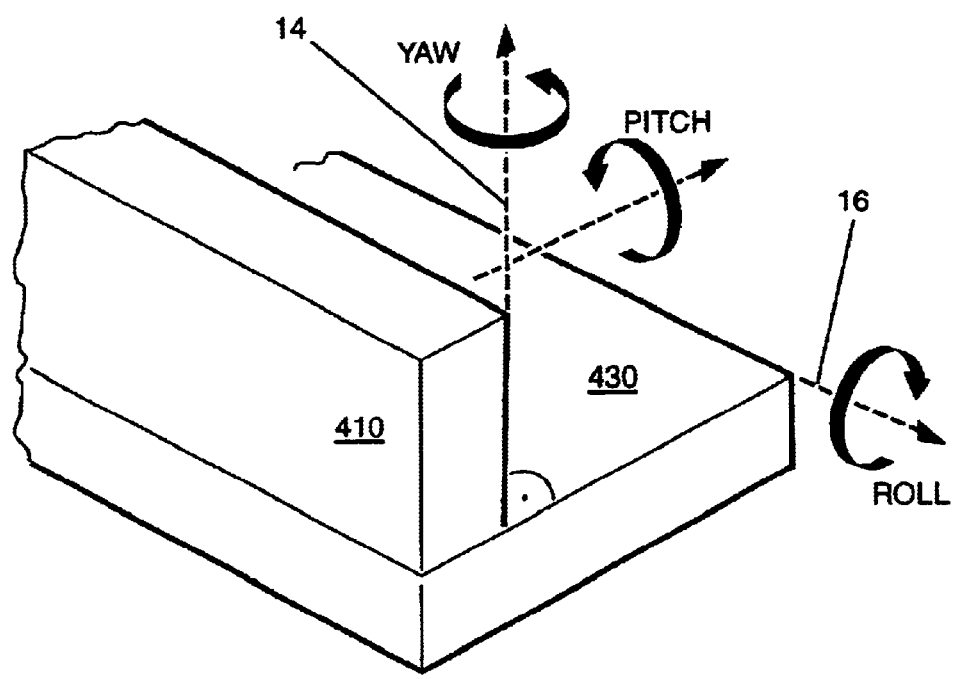
Figure 2B:
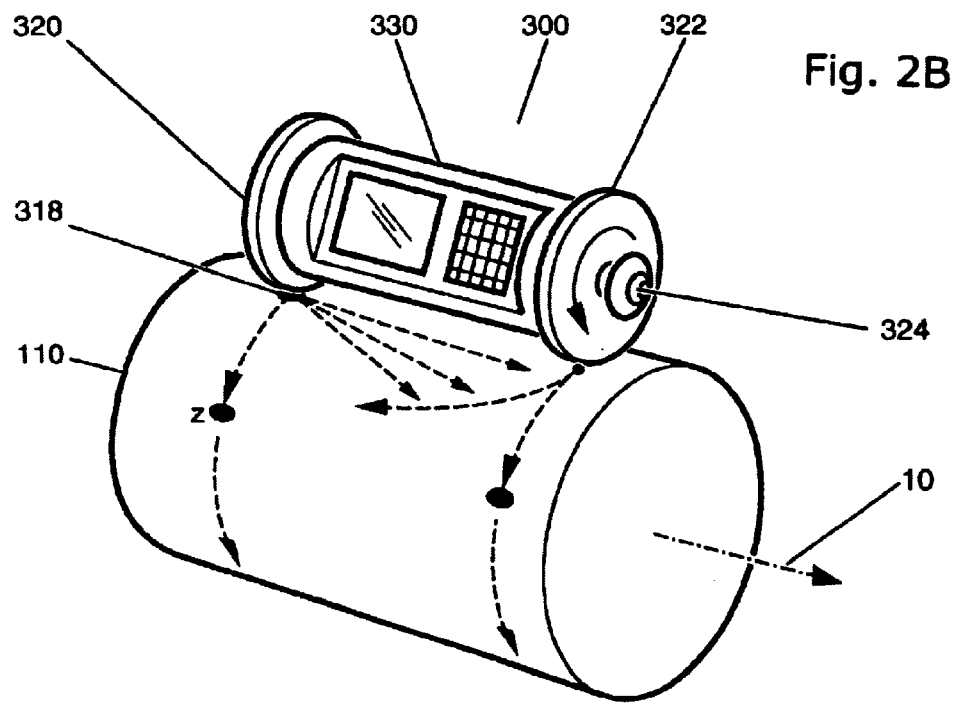
Figure 2A:
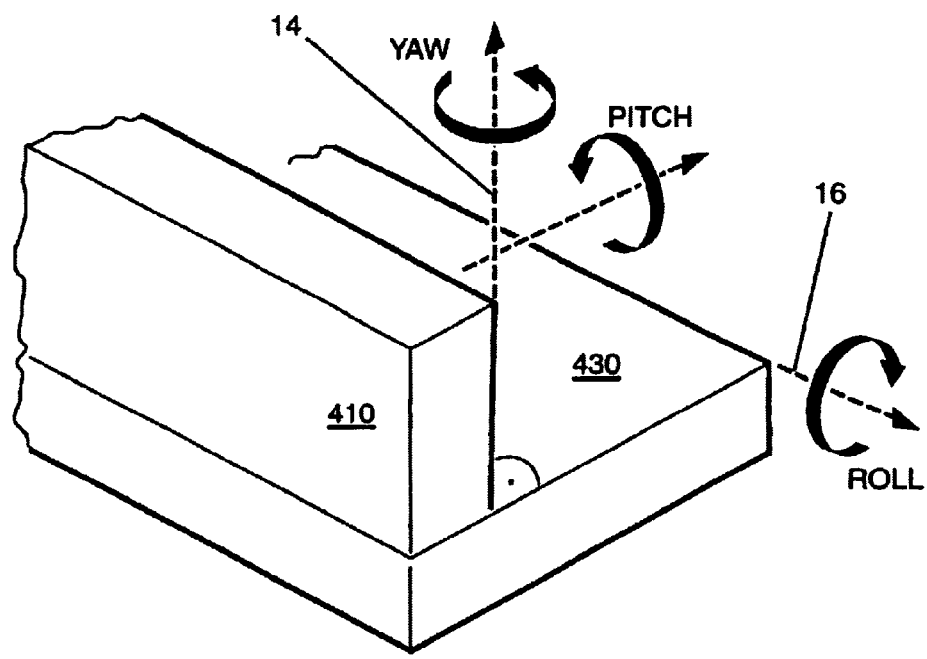

The calibration of the probe 130 relative to the reference direction 10' can take place by the probe 130, before the first measurement, by placement against the corresponding stationary reference surface combination 410, 430, as is schematically shown in FIG. 2A.

FIG. 2B shows a second embodiment of a measurement device 300 in which the probe 330 is provided with a circular disk 322 as the attachment area instead of with a prod. The handle for manual swiveling of the probe 330 is labeled 324 during the first and the second measurement. The circular disk 322 can be fixed with respect to the probe 330 and acts in this embodiment as a circularly curved knife edge which forms a point of contact with the peripheral surface of the roller during the measurement. When the probe 330 is swung manually during the measurement, the disk 322 slides on the peripheral surface of the roller. The front support point 318 of the probe 330 is stationary during each individual measurement as in the preceding embodiment and is used as the swiveling point.

Instead of being stationary with respect to the probe 330, the circular disk 322 can also be pivotally supported with respect to the probe 330, and in this case, the circular disk 322 can act as a wheel which when the probe 330 is swung around the front support point 318 during each measurement the circular disk 322 rolls on the peripheral surface of the roller.

If desirable, the front end of the probe 330 can also be provided with a circular disk 320 which on its circumference forms an attachment point 318 which is stationary during the respective measurement. In this configuration of the measurement device 300, it is possible for the probe 330 to roll around the axis 10 of the roller on the peripheral surface of the roller in order to move the probe 330 from the first measurement position into the second measurement position. In this embodiment, however, the roll angle must be detected in order to evaluate the measurement results. If detection of the roll angle is to be avoided, the probe 330 should not roll on the peripheral surface of the roller, but would have to be moved out of the first measurement position into the second measurement position by means of the slippage of the circular disks 320, 322 on the peripheral surface of the roller such that rolling motion of the probe 330, i.e. rotation around the lengthwise axis of the probe 330, does not take place.

Figure 4:
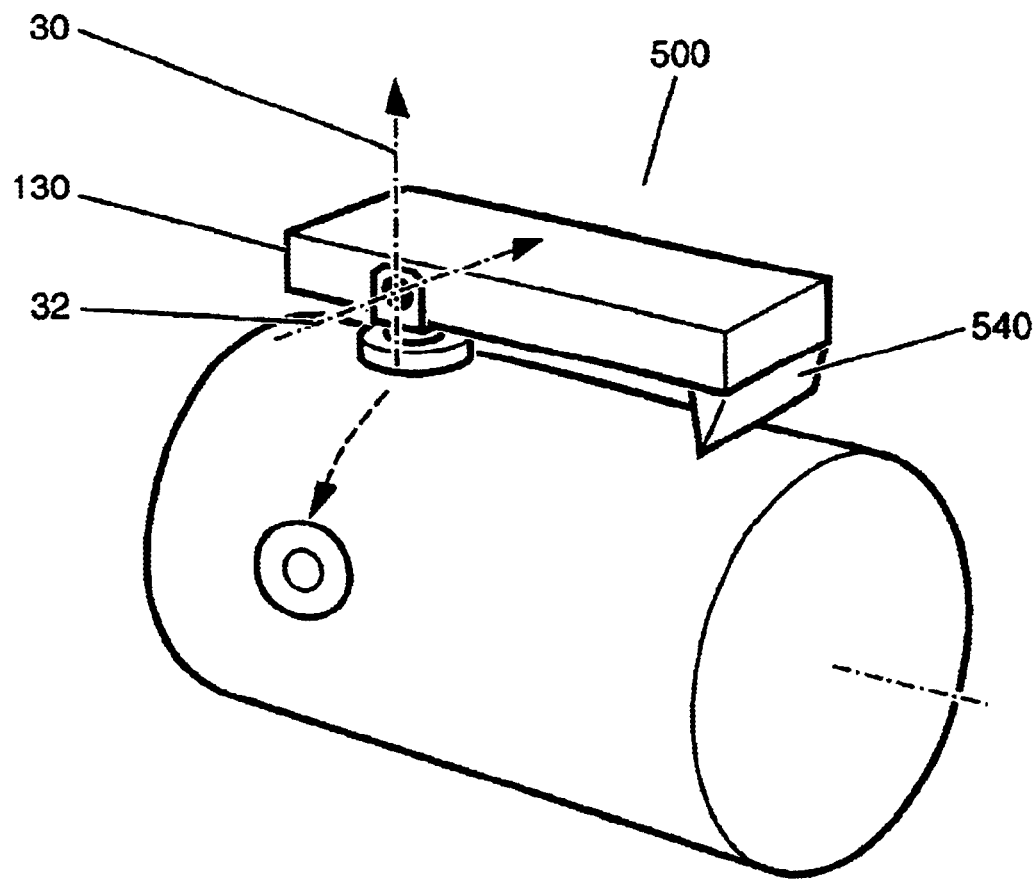
FIG. 4 shows, in a view similar to FIG. 3, a fourth embodiment of a measurement device of the invention.

FIG. 4 illustrates a modification of the embodiment from FIG. 1 with the prod 140 being replaced by a straight or polygonal knife edge 540 which rests on one point on the peripheral surface of the roller. In each measurement, the knife edge 540 is manually pushed into contact with the peripheral surface of the roller over the latter, by which the probe 130 is swiveled around the magnet shoe 120 or the axis 30. When the axis 30 cannot be tilted laterally, only the measurement of the yaw angle changes, and not the pitch angle. Thus, when each measurement is plotted, as in FIG. 5, a straight line is formed, with there being an offset to the lines measured at the other roll angle since the pitch angle in each measurement depends on the roll angle. Since the lines intersect one another, the evaluation of the roll angle in this embodiment is essential to determine the misalignment. Finally, instead of being made straight, as in FIG. 4, the blade 540 can also be made curved, for example, in an arc-shape.

Figure 3:
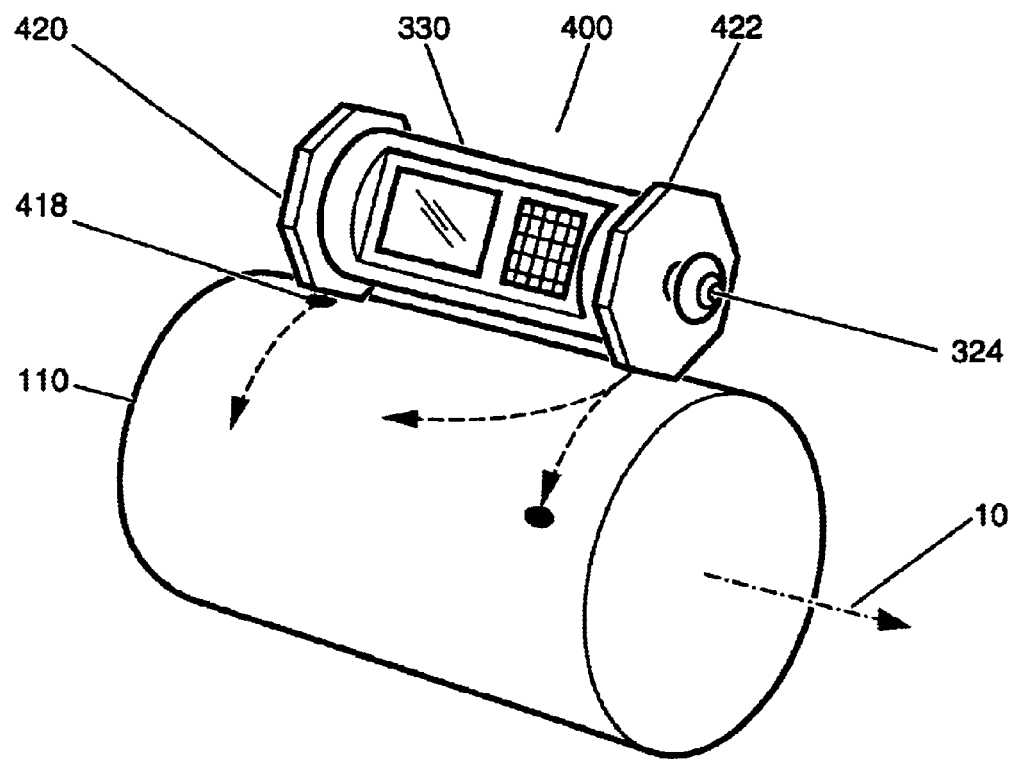
FIG. 3 shows, in a manner similar to FIG. 2, a third embodiment of a measurement device of the invention.

A particular modification of the embodiment shown in FIG. 2 is illustrated in FIG. 3, where the two round disks 320, 322 are replaced by a corresponding disk 420, 422 with a polygonal outside periphery. The respective straight section of the polygon with which the rear disk 422 is placed on the peripheral surface of the roller is pushed manually into contact with the peripheral surface of the roller in each measurement over the peripheral surface of the roller, the probe 330 being swung around the front support point 418. If the same section of the polygon is used in each measurement, this corresponds functionally to the embodiment from FIG. 4. However, for different measurements different sections of the polygon can also be used to keep the effect of the rolling angle small.

For all embodiments, the front attachment or contact point of the probe on the peripheral surface of the roller can also be made during the swiveling of the rear attachment or contact point resulting in a certain tilting of the probe, i.e., a change of the roll angle of the probe, is allowed. However, in this situation, the roll angle or its change must be detected at the same time in order to enable reliable evaluation of the measurement results of the pitch and yaw angle.

In the first measurement and the second measurement, the swiveling angle range of the rear attachment point around the front attachment point is chosen such that a rather large number of measured value pairs (pitch angle, yaw angle) is obtained in order to enable reliable curve matching and thus reliable determination of the intersection point of the curves. The pivot angle is advantageously at least 10°. In order to evaluate the measured values and to determine the alignment of the roller which is to be measured, the measurement device is provided with a corresponding evaluation unit which is however not shown separately in the figures.

If the axes 12, 14, 16 do not at least roughly coincide with the corresponding axes of symmetry of the probe, the roll angle of the probe must be measured in order to determine the angle of rotation around the axes 12, 14, 16 (which are fixed in space by means of a suitable coordinate transform) from the values of the angle or rotation around the axes which are fixed on the probe. The values are measured directly by the probe.

What is claimed is:

1. Process for determining the alignment of a cylindrical body with respect to a reference direction by means of a measurement device having a first attachment area and a second attachment area and a position measurement probe calibrated relative to the reference direction and which is capable of detecting a first angle of rotation of the probe around a first axis which is fixed in space and is capable of detecting a second angle of rotation of the probe around a second axis fixed in space, comprising the steps of:

performing a first measurement in which the probe is located with the first attachment area and the second attachment area on a peripheral surface of the body, wherein the first attachment area is a first measurement position which is held stationary with respect to the peripheral surface of the body and wherein, at the second attachment area, the probe is angularly displaced relative to the first attachment area into contact with the peripheral surface of the body;

detecting, during the angular displacement the characteristic of the first angle and the second angle of rotation;

performing a second measurement in which the probe is attached with the first attachment area and the second attachment area on another part of the peripheral surface of the body which is offset in a peripheral direction from the area on the peripheral surface of the body on which the probe is located during the first measurement, wherein the first attachment area is held stationary with respect to the peripheral surface of the body and wherein, at the second attachment area, the probe is angularly displaced relative to the first attachment area into contact with the peripheral surface of the body, detecting, during the angular displacement, the characteristic of the first angle and the second angle of rotation, performing a comparison of the characteristic of the first angle and second angle of rotation from the first measurement with the characteristic of the first angle and second angle of rotation from the second measurement, and determining the alignment of the body, as result of the comparison, with respect to the reference direction.

2. Process as claimed in claim 1, wherein the first axis is perpendicular to the second axis.

3. Process as claimed in claim 2, wherein, when the probe is aligned horizontally relative to the body, the first axis and the second axis are positioned such that the first angle of rotation is the elevation angle and the second angle of rotation is the azimuth angle.

4. Process as claimed in claim 1, wherein, during the comparison of the first and the second measurement, either the first angle of rotation is plotted as a function of the second angle of rotation or the second angle of rotation is plotted as a function of the first angle of rotation, and the deviation of the alignment of the body from the reference direction is determined from the intersection point of the plotted curve of the first measurement with the corresponding plotted curve of the second measurement.

5. Process as claimed in claim 4, wherein one compensation function at a time is determined from the detected values of the first and the second measurement by curve matching such that the deviation of the alignment of the body from the reference direction is determined from the intersection point of the compensation functions.

6. Process as claimed in claim 1, wherein the first measurement and the second measurement is detected along the entire angular displacement of the second attachment area with respect to the first attachment area and wherein the angular displacement is at least 10 degrees.

7. Process as claimed in claim 1, wherein, during the second measurement, the measurement probe moves from an initial position to an end position, and further, the initial position and end position of the probe during the second measurement is essentially parallel to a corresponding initial position and end position of the probe during the first measurement.

8. Process as claimed in claim 1, wherein during the first measurement and the second measurement, the probe is essentially aligned such that a connecting line between the first attachment area and the second attachment area is aligned essentially parallel with a lengthwise axis of the body.

9. Process as claimed in claim 1, wherein the second attachment area is in the form of a tip which is adapted to be manually pushed manually over the peripheral surface of the body and in contact with the peripheral surface of the body during the first measurement and second measurement.

10. Process as claimed in claim 1, wherein the second attachment area is in the form of a wheel which is adapted to be rotationally supported with respect to the probe and is tangential, with respect to the angular displacement motion, to the second attachment area relative to the first attachment area;

and wherein, during the first measurement and the second measurement, the wheel is manually rolled on the peripheral surface of the body.

11. Process as claimed in claim 1, wherein the second attachment area is in form of a knife edge which is tangential, with respect to the swiveling motion, to the second attachment area relative to the first attachment area, and wherein the knife edge, during the first measurement and second measurement, is manually pushed over the peripheral surface of the body and in contact with the peripheral surface of the body.

12. Process as claimed in claim 11, wherein the knife edge is of a flat or a polygon shape.

13. Process as claimed in claim 11, wherein the knife edge is curved in either a circular or circular arc shape.

14. Process as claimed in claim 11, further comprising detecting, utilizing a detector means, when the second attachment area is in contact with the peripheral surface of the body such that measured values are recorded for the characteristic of the first angle of rotation and the second angle of rotation.

15. Process as claimed in claim 14, wherein the detector means detects the pressure force of the second attachment area on the peripheral surface of the body.

16. Process as claimed in claim 14, wherein the detector means detects whether there is electrical contact imparted from the peripheral surface of the cylindrical body between the first attachment area and the second attachment area.

17. Process as claimed in claim 1, wherein the axis of the angular displacement motion in the first measurement and the axis of the angular displacement motion in the second measurement are essentially parallel to one another.

18. Measurement device for determining the alignment of a cylindrical body with respect to a reference direction comprising:

a position measurement probe adapted to be calibrated relative to the reference direction and to detect a first angle of rotation of the probe around a first axis which is fixed in space and to detect a second angle of rotation of the probe around a second axis which is fixed in space, the probe including a first attachment area and a second attachment area for positioning of the probe on a peripheral surface of the body; and an evaluation unit, wherein the position measurement probe is adapted to be movable after a first measurement from a first measurement position to a second measurement position displaced from the first measurement position for performing a second measurement, wherein the first attachment area is adapted to be fixedly attached to the peripheral surface of the body during each measurement, while the second attachment area is adapted to be angularly displaced in contact with the peripheral surface of the body with respect to the first attachment area, and wherein the evaluation unit is adapted, during the first and the second measurement, to detect a characteristic of the first angle of rotation and the second angle of rotation during each measurement, perform a comparison of the characteristic of the first angle and second angle of rotation from the first measurement with the characteristic of the first angle and second angle of rotation from the second measurement, and to determine the alignment of the body with respect to the reference direction.

19. Device as claimed in claim 18, wherein the first attachment area has a foot that is detachably mountable on the peripheral surface of the body and can be swung with respect to the probe around two axes which are perpendicular to one another.

20. Device as claimed in claim 19, wherein a first axis of the two axes of the foot is perpendicular to the peripheral surface of the body and a second axis of the two axes of the foot is perpendicular to a connecting line between the first attachment area and the second attachment area.

21. Device as claimed in claim 20, wherein the alignment of the first axis of the foot is variable with respect to the foot such that the first axis is essentially fixed in space and is parallel to the second axis which is also fixed in space regardless of the position of the foot on the peripheral surface of the body.

22. Device as claimed in claim 19, wherein the foot comprises a magnet.

23. Device as claimed in claim 18, wherein the probe includes a mechanical or optical gyroscope for each axis of angle of rotation.

* * * * *